(12) United States Patent
Breslau et al.

(10) Patent No.: US 7,953,020 B2
(45) Date of Patent: May 31, 2011

(54) METHOD FOR IMPLEMENTING AND REPORTING ONE-WAY NETWORK MEASUREMENTS

(75) Inventors: Lee Breslau, Basking Ridge, NJ (US); Nicholas G. Duffield, Summit, NJ (US); Subhabrata Sen, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 924 days.

(21) Appl. No.: 11/478,948

(22) Filed: Jun. 30, 2006

(65) Prior Publication Data

US 2007/0268882 A1 Nov. 22, 2007

Related U.S. Application Data

(60) Provisional application No. 60/802,399, filed on May 22, 2006.

(51) Int. Cl.
*H04L 12/28* (2006.01)
(52) U.S. Cl. .................................. 370/252; 370/236
(58) Field of Classification Search .............. 370/254, 370/229, 401, 85, 252, 232, 473, 392, 327; 711/146; 717/173; 714/4; 709/236, 224
See application file for complete search history.

(56) References Cited

U.S. PATENT DOCUMENTS

| | | | | |
|---|---|---|---|---|
| 4,677,612 A | * | 6/1987 | Olson et al. | 370/445 |
| 6,650,640 B1 | * | 11/2003 | Muller et al. | 370/392 |
| 6,721,334 B1 | * | 4/2004 | Ketcham | 370/473 |
| 6,775,749 B1 | * | 8/2004 | Mudgett et al. | 711/146 |
| 6,859,455 B1 | * | 2/2005 | Yazdani et al. | 370/392 |
| 6,958,977 B1 | | 10/2005 | Mitrani et al. | |
| 7,180,585 B2 | * | 2/2007 | Kreh et al. | 356/237.2 |
| 2003/0107990 A1 | * | 6/2003 | Herschleb et al. | 370/229 |
| 2003/0198235 A1 | * | 10/2003 | Weldon et al. | 370/401 |
| 2004/0044764 A1 | * | 3/2004 | Padmanabhan et al. | 709/224 |
| 2004/0221190 A1 | * | 11/2004 | Roletto et al. | 714/4 |
| 2005/0022180 A1 | * | 1/2005 | Couturier | 717/173 |
| 2005/0044213 A1 | | 2/2005 | Kobayashi et al. | |
| 2005/0182850 A1 | * | 8/2005 | Kohno | 709/236 |
| 2005/0220035 A1 | * | 10/2005 | Ling et al. | 370/252 |
| 2006/0023642 A1 | * | 2/2006 | Roskowski et al. | 370/254 |

(Continued)

FOREIGN PATENT DOCUMENTS

WO WO2005/109754 11/2005

OTHER PUBLICATIONS

Claise, B. et al., "Cisco Systems NetFlow Services Export Version 9", IETF Standard, Internet Engineering Task Force, Oct. 2004.

(Continued)

*Primary Examiner* — Kwang B Yao
*Assistant Examiner* — Syed M Bokhari

(57) ABSTRACT

A method is disclosed for implementing and reporting network measurements between a source of probe packets and an element, such as a router. The invention exploits commonly implemented features on commercial elements. By exploiting these features, the expense of deploying special purpose measurement devices can be avoided. In one aspect of the invention, a plurality of probe packets is transmitted in a packet network with each of the probe packets having the same key and the same aggregation characteristic. A report is then received from an instructionless element regarding the plurality of probe packets, thereby enabling measurement of a parameter of the packet network.

12 Claims, 2 Drawing Sheets

U.S. PATENT DOCUMENTS

2006/0227735 A1* 10/2006 Baird et al. .................. 370/327

OTHER PUBLICATIONS

Postel, J., "Character Generator Protocol; rfc864.txt", IETF Standard, Internet Engineering Task Force, May 1983.

PCT International Search Report corresponding to PCT Patent Application PCT/US2007/011564 filed May 15, 2007 (4 pages).

PCT Written Opinion of the International Searching Authority corresponding to PCT Patent Application PCT/US2007/011564 filed May 15, 2007 (7 pages).

* cited by examiner

METHOD FOR IMPLEMENTING AND REPORTING ONE-WAY NETWORK MEASUREMENTS

This application claims the benefit of U.S. Provisional Application No. 60/802,399 filed May 22, 2006 which is incorporated herein by reference.

BACKGROUND OF THE INVENTION

The invention involves methods for implementing and reporting network measurements between a source of probe packets and an element, such as a router. The invention exploits commonly implemented features on commercial elements. By exploiting these features, the expense of deploying special purpose measurement devices can be avoided.

Network traffic measurement is an essential component of communications network management. Both passive and active measurement methods are currently deployed. In passive measurement methods, ordinary traffic packets are observed at network elements, such as routers, which then compile reports on the packets, either singly or in aggregate. The reports are either stored at the network element for retrieval by the network management system (the pull model, e.g. for SNMP statistics) or dispatched to a collector (the push model, e.g. NetFlow statistics). Passive measurement is most commonly used to determine the amounts of traffic of various types (e.g. as indicated by packet header fields) flowing in the network.

In active measurement, probe packets are introduced into the network (e.g., by a special purpose source measurement device) and dispatched to one or more destination network elements. Active measurement is most commonly used to determine the performance properties of the path between the source and the destination(s), and/or the performance properties of the destination device(s) themselves. Determining these properties is essential for network management purposes including anomaly detection, network health monitoring, SLA conformance monitoring, and root cause analysis.

A large number of active measurement techniques have been developed in order to measure or infer various path performance properties. From the service provider point of view, it is useful to classify each technique according to whether it suffices for the measurement destination to be an ordinary production device (such as an already deployed router) or whether it must be a special purpose measurement device. This is an important distinction because the introduction of an additional measurement device carries equipment, management and administrative costs which can be substantial if many such devices are required to be deployed at the scale of a large network. One role that may be performed by such a special purpose measurement device is to terminate active measurements by receiving the probe packets and to compile and dispatch reports on them. This functionality not routinely provided by ordinary production devices. For this reason, it would be advantageous if such functionality could be effectively performed by ordinary production devices.

Another way in which ordinary and special purpose devices can be distinguished is in the way they treat probe sequence numbers. In several measurement applications one wants to keep track of an application sequence number that could be used to identify the same packet seen at multiple points along its path, or at distinct endpoints in the case of multicast probes. The measurement capabilities supported by ordinary routers do not typically read or report on such sequence numbers, whereas a special purpose device can be configured to do so. Again, it would be advantageous if such functionality could be effectively performed by ordinary production devices.

An example of an active measurement technique is described in U.S. Pat. No. 6,958,977. The '977 patent involves a plurality of capture-capable network agents (CCNAs) that are controlled by a testing center and are coupled to the network at various locations. The CCNAs intercept packets that meet a predetermined filtering criterion that is specified by the testing center, and report to the testing center on the intercepted packets. By collecting reports from multiple CCNAs that intercept a given packet passing through the network from one end-point to another, a testing center is able to analyze details of the route and timing characteristics of the multiple links and nodes within the network.

The CCNAs may comprise software agents associated with an existing piece of network equipment, such as a switch or router, or they may comprise stand-alone probes. The CCNAs are directed by the testing center to perform various functions and pass the results back to the testing center. With these results, the testing center is able to calculate various network parameters.

In the method of the '977 patent, the testing center, which creates the unique packets, must inform the CCNAs about those packets. With that information, the CCNAs then filter out and report on the packets that meet the designated criteria, letting the other network packets continue on their course. If the testing center does not inform the CCNAs about these packets, the CCNAs would not know to filter and analyze the relevant packets from all of the other packets traveling through the network. In such "instructioned" measurements, the network element must be instructed on, for example, which packets to measure and what measurements to make. We refer to such network elements as "instructioned" network elements and to such measurements as "instructioned" measurements.

As opposed to instructioned" measurements, certain measurements are made by the network element without any specific, special instruction being given to the network element, either directly or by the packet to be measured, regarding what specific action is to be taken with regard to this measurement, or the specific packets to be measured. Rather, the measurement is made in the normal course of management by the network element—the specific nature of the report is prompted by the characteristics of the packet and the normal management protocol of the network element, rather than by any special instruction to the network element relating to a specific measurement. We refer to such measurements as "instructionless" measurements, and to such network elements as "instructionless" network elements, because the network elements do not receive any specific instructions, either directly or by the packet to be measured, regarding the specific measurement to be made or the specific packets to be measured Another classification of network measurement techniques depends on whether they measure properties of the one-way path from the source measurement device to the destinations, or whether they measure round trip properties. Roundtrip properties are typically easier to measure, because they do not require the destination to participate in the collection of probe packets and compilation and dispatch of reports. Rather, they are required only to use their normal capabilities to respond to probe packets by sending a packet, usually back to the probe source, which terminates the measurements. The commonly used ping and trace-route tools fall into this category.

On the other hand, roundtrip measurements are less useful than one-way measurements since it is not possible to distinguish (at least with any certainty) whether the observed performance should be attributed to the outward or return path. For example, when roundtrip loss is observed for a probe packet stream, it is not known what portion of the loss occurs on the outward path and what portion on the return path. The inherent ambiguities of interpreting round-trip measurements make one-way measurement more attractive for understanding network properties, while at the same time they are more challenging to implement because ordinary network elements cannot terminate arbitrary probe packet streams.

Accordingly, it would be advantageous to have more efficient network measurement techniques which do not require specialized network equipment other than a probe source and which could be used to make one-way network measurements.

BRIEF SUMMARY OF THE INVENTION

The present invention involves an improved network measurement technique. In one aspect of the invention, a plurality of probe packets is transmitted in a packet network with each of the probe packets having the same key and the same aggregation characteristic. A report is then received from an instructionless network element regarding the plurality of probe packets, thereby enabling measurement of a parameter of the packet network.

In at least one embodiment, the present invention involves a probing strategy that exploits and matches the inherent spatial and temporal granularity of NetFlow or SNMP MIB polling in order to coerce reports on discrete groups of probe packets. Specifically, a source device sends a sequence of probe packets into the network. The Netflow records or SNMP queries are used to determine whether and how many of these packets are received at one or more routers in the network. In this way, the one-way loss rate along each link in the path can be determined. Further, if the routers provide synchronized clocks, the one-way delay of a subset of the probe packets may be determined.

One benefit of this embodiment of the invention is the ability to conduct one way active measurements from a device using existing functionality at the target or intervening network element (such as a router on the packet path) without requiring the deployment and management of additional measurement infrastructure, and the costs that would be concomitant to such deployment. Employing the inventive measurement mechanisms would provide more flexible measurement capabilities and improve the ability to troubleshoot a network, thereby offering better service to network customers.

An example of using the existing functionality of a Network to determine one-way measurements is seen in one of the embodiments of the current invention. When packets pass through a router along their path, the router automatically aggregates information about certain of the packets. Periodically the router makes reports on the various aggregated sets of packet information. The router sends these reports as part of its normal protocol to a router report collector within the Network. At the collector, the reports can be further analyzed offline.

In this embodiment, there is a probe packet source that creates a packet or a set of packets that will cause the router to make a unique report among the various aggregated reports. Since the packet set already contains a unique key that will cause the router to make a unique report, there is no need to communicate to the router or any other network or non-network element any property of the probing packet sent.

Another benefit of the present invention is the ability to measure one-way parameters to the network edge. Currently measurements are performed between dedicated devices in router centers. The inventive method would allow one way measurement out to thousands of peering and customer edge points without the need to deploy and manage additional measurement boxes at those edge points. This represents a large cost saving. Since customers are increasingly sensitive to provider network performance, the additional measurement functionality would be a positive factor in attracting and retaining customers.

These and other advantages of the invention will be apparent to those of ordinary skill in the art by reference to the following detailed description and the accompanying drawings.

DETAILED DESCRIPTION

This invention exploits the fact that the limited measurement capabilities of ordinary production network elements, such as exemplary routers, typically have a temporal and spatial granularity. Measurement capabilities within current network elements such as routers enable the creation of reports that relate to a subset or aggregation of the traffic that are, for example, incident at the router during some limited time frame. Furthermore, all packets of the subset share certain properties—a "common key"—that can be discerned by the router measurement capability, and which distinguishes the packets in the subset from all other traffic incident at the router during that time frame. This common key can be single dimensional or multidimensional, i.e., the key can be a single property characteristic of each packet in the subset, such as for example the source address, or a plurality of properties characteristic of each packet in the subset, such as for example the source and destination addresses. In addition to the common key, the plurality of packets has another characteristic which causes them to be aggregated by the network element for a single report. Most simplistically, this "aggregation characteristic" may relate to the fact that the plurality of packets was sent within a given time period.

In one aspect, our method entails tailoring a set of active measurement packets, or probe packets, such that if one or more of them reach an ordinary router, they will cause the router to form a measurement report that relates to the set of probe packets, and to no other traffic. This achieves effective termination of the active measurement for that set of packets. Such tailoring of a stream of active measurement packet sets results in distinct packet sets causing the formation of distinct reports if any of their packets reach the ordinary router. (Much of the discussion herein will be in terms of exemplary routers, but persons having ordinary skill in the art will recognize that other network elements besides routers may be used in other embodiments to practice the invention.

Figure 1:
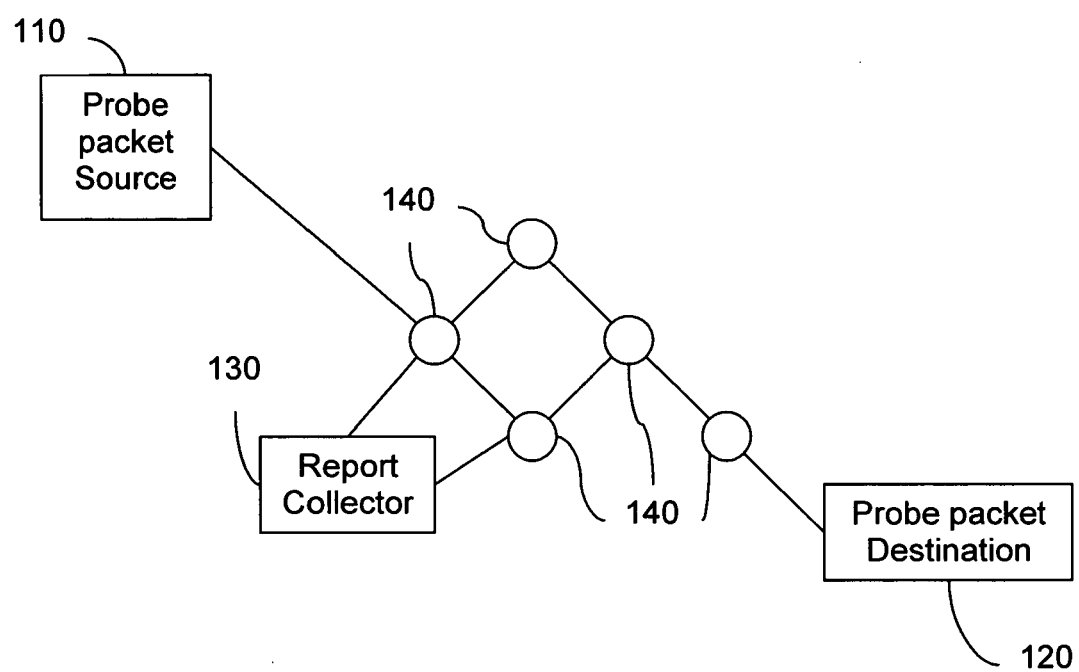
FIG. 1 is a block diagram that schematically illustrates an embodiment of the invention for determining one-way parameters of a packet network.
Figure 2:
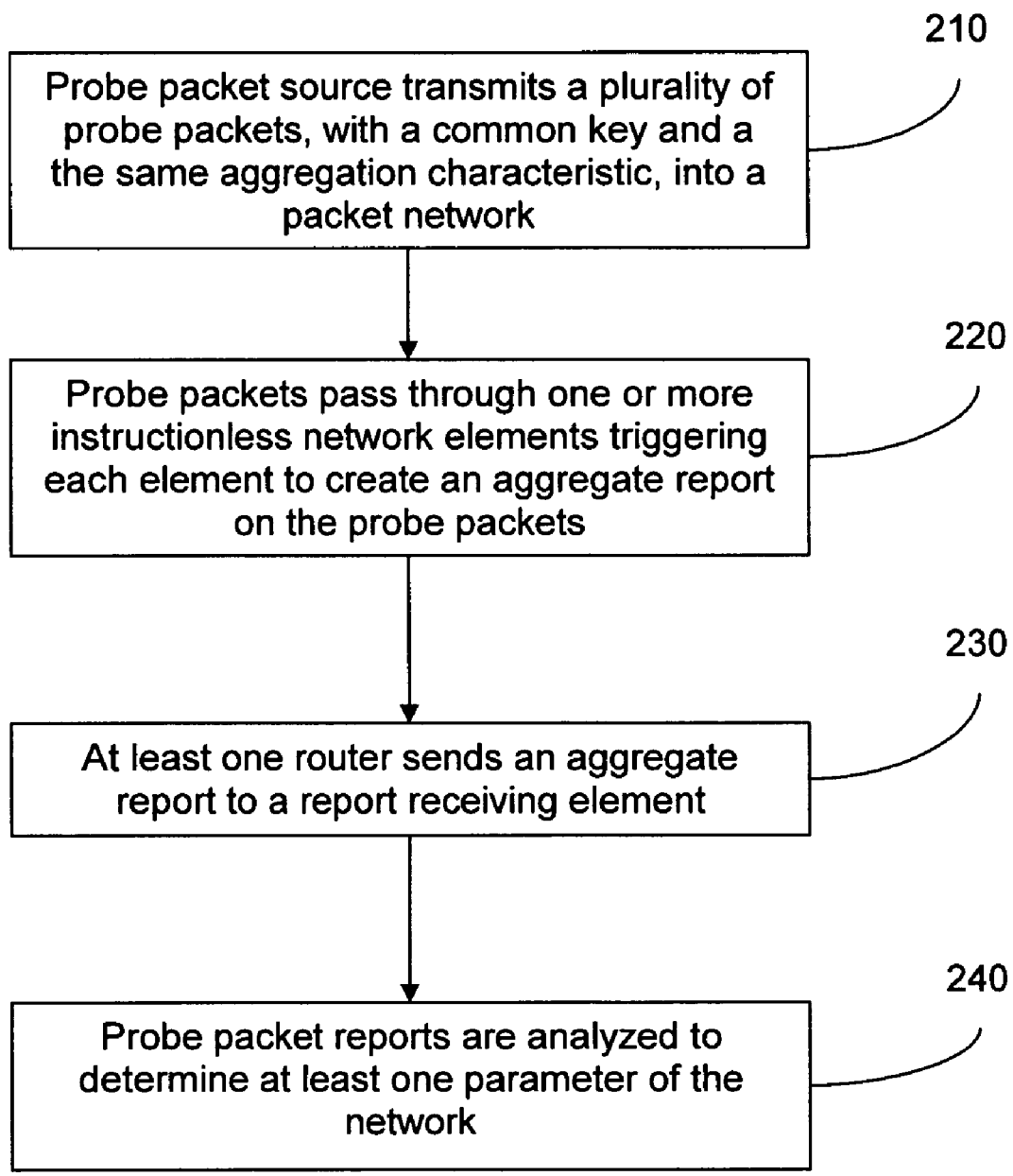
FIG. 2 is a flow chart that schematically illustrates a method of measuring network parameters of a packet network.

FIG. 1 is a schematic representation of elements that may be used to practice this invention. FIG. 1 is best understood in the context of FIG. 2 which is a flow chart that schematically illustrates a method of measuring a parameter of a packet network in accordance with an aspect of this invention. In FIG. 2 at 210 a probe packet source transmits a plurality of probe packets into a packet network. The probe packets have a common key which distinguishes the probe packets from other packets in the network. The plurality of probe packets have the same aggregation characteristic which will result in the packets being the subject of a report by a network element. At 220, the probe packets pass through one or more instructionless network elements triggering each element to create an aggregate report on the probe packets. At step 230, at least one router sends an aggregate report to a report receiving element. At step 240, the probe packet reports are analyzed to determine at least on parameter of the network. Such reports may include information on one-way parameters of the network.

As indicated above, FIG. 1 is a schematic representation of elements that may be used to practice this invention. In FIG. 1, 110 is a probe packet source that transmits a plurality of probe packets addressed to probe packet destination, 120. 140, are various network elements such as routers, and 130 is a report collector. The report collector receives the reports from one or more of the network elements, such as the routers, 140. While the report collector is shown as a separate element, in other embodiments it can be part of the probe source or any other element. The probe packet destination, 120, may be an end user or a specific network element. The probe packets contain a unique key and common aggregation characteristic that cause the router 140 to make a report that relates to the plurality of packets and to substantially no other packets.

Whenever packets pass through any of the elements 140, the element makes a record of the packet and aggregates the packet with other like packets. In this embodiment, the element aggregates a plurality of the probe packets separately from any other packets passing through the element. Periodically, the element 140 sends reports on the various aggregate sets of packets to a report collector 130. At the collector, the single or multiple reports documenting the journey of the probing packets can easily be isolated from the other aggregated reports for analysis to determine at least one parameter of the network, including, is some embodiments, a one-way parameters.

When there is a sequence of probe sets, we are able to correlate each probe set that is sent with the resulting measurement record(s) generated by a collector. So if, in particular, each packet carries a sequence number or some other unique identifier, we can associate the sequence number of the first packet of any group to the corresponding measurement record(s). The correlation can be achieved by using one (or both) of the following methods:

Time Comparison: Probe groups and reports are matched up by using suitably synchronized clocks at the probe source and the observation point (if it timestamps reports) or the collection subsystem. This method requires knowledge of propagation times and their variability, together with sufficient separation between groups in order to unambiguously match probe groups to reports. Timing artifacts due to external synchronization (e.g. NTP or GPS) may need to be removed by one of a number of available methods.

Dead Reckoning: Probe groups and reports are matched by counting from the commencement of probing. Gaps in the report sequence due to complete loss of a probe set must be identified and filled. This requires sufficient temporal separation between groups.

The implementation of our method relies on the measurement capability of the ordinary router which is to be exploited. Following are two embodiments utilizing the operating system Netflow. NetFlow is an operating system feature of Cisco routers; related capabilities are provided by other router vendors, and flow measurement capabilities based on NetFlow are the subject of standardization in the IETF.

We now give a brief description of NetFlow in order to explain how our method applies. NetFlow compiles reports on flows of IP packets—a flow being a set of packets sharing a common property, known as the key, and incident at an exemplary router network element during a certain time frame. When an IP packet arrives at the router, the router calculates the key for the packets, which is typically a function of the IP packet header (including source and destination address) and transport protocol (UDP/TCP) header (including protocol type and source and destination port numbers). In future versions of NetFlow, additional information, such as MPLS labels, may also form part of the key. The router maintains a summary for each packet key that it observes, including the total packets and bytes seen with that key, and time of first and most recent arrival. These are updated accordingly when the packet arrives. If no summary is currently kept for the arriving packet's key, one is first instantiated.

The router is said to terminate the flow by closing out the summary, exporting it as a record to the collector (i.e., a separate network device), and freeing up storage for statistics for new flows. Termination can occur for several reasons:

(i) inactive timeout: the time since the router last observed a packet bearing the summary's key exceeds a threshold. Common values for the threshold are of the order of 30 s or 1 min.

(ii) active timeout: the time since the summary was first instantiated exceeds a threshold. The active timeout period is usually long compared with the inactive timeout, e.g. 30 minutes.

(iii) protocol based: a packet signaling the end of a connection at the transport level is observed, for example, a TCP packet with the SYN or RST flag set.

(iv) resource management: a flow may be terminated to free up the router's flow cache if this is becoming full.

These methods of flow termination afford an opportunity to terminate the active measurement of a suitably crafted set of probe packets. We describe two ways to terminate the active measurements.

(i) Timeout based. A set of probe packets is dispatched bearing packet header information distinct from all other traffic, i.e., by source and destination IP address and TCP/UDP port number, and/or by MPLS label. Address spoofing could possibly pollute IP header based identification, although this has low probability to succeed and may by independently detected and/or blocked at the ISP level. In order for individual groups of probe packets to each give rise to a single report, the time between dispatch of the first and last packets is preferably less than the inactive timeout, so that loss of one or more packets in transit, coupled with variation in propagation delay, or load balancing possibly causing packet to take different paths, could not cause any observing router to generate two flow records for the set. For example, consider the case that all but the first and last packets are lost. The difference in arrival time at a router must be less than the inactive timeout if they are to be reported in the same flow record. Finally, each set of packets is to be separated by a time exceeding the inactive timeout, in order that each will give rise to separate flow records. Note that each NetFlow enabled router on the path taken by the packets, and not just a NetFlow destination router, will generate flow records in same manner. More generally we might have a probe set that lasts considerably longer than the inactive timeout period, but which is separated from neighboring groups by periods considerably longer than the inactive timeout period. Such a group might generate multiple NetFlow records, which can then be grouped and joined at the collector based on their timestamp relative to other reports.

(ii) Protocol Based. IP address or reserved TCP/UDP port or MPLS label are used as in (i) above to distinguish traffic. Flow termination is triggered by sending a TCP FIN or RST packet as the last packet of a set. If this packet is lost before it reaches the router there are at least two options.

One option is to send multiple FIN or RST packets; the first one observed will terminate the desired flow record, the rest will generate extraneous one packet flow records which must be discarded from the analysis. We note that flow cache clearance by the router for resource management (termination method (iv) above) can interfere with both these methods, due to the potential to close out and export a flow record while a group of packets is being processed by the router, hence giving rise to multiple flow records for that group. Events of this type can be detected at a collector as follows. If the time between probe packet sets is substantially longer than the inactive flow timeout, the collector would observe successive flow records with closer arrival times than expected. In this case, the collector could aggregate multiple flow records into a single flow record representing all packets in the probe set.

A second option in dealing with the flow terminating packet being lost before it reaches the router is based on SNMP. Routers ubiquitously maintain, as part of their Management Information Base (MIB), aggregate statistics of all traffic traversing their interfaces in the form of cumulative counts of packets and bytes seen. By regularly polling these counters using the SNMP protocol, the difference between successive counts indicates the average data rate during the polling interval. However these statistics are increasingly being kept at finer spatial granularity. If one can arrange for probe traffic to exclusively cause increments of one such counter, then polling of that counter indicates the cumulative amount of probe traffic that has reached the router. Following are two examples:

(i) IP Multicast. Multicast enabled routers maintain a MIB that contains per group, or per source/group pair, counters. Thus we reserve and configure a multicast group, or pair of source and multicast group, for probing.

(ii) Virtual Interfaces. We assume a MIB is maintained for each virtual interface configured on an ATM or Frame Relay switch. By configuring a virtual path from a probe source to a target machine and then arranging for probe traffic to pass exclusively through the virtual channel configured at a target network element, the MIB statistics reported for that channel will reflect exactly the probe traffic seen there. By synchronizing probe generation with SNMP polling of a target network element, perhaps only roughly, we may determine, for example, how many packets in a probing set reached the router. This is straightforward when the duration of a probe packet set, plus any uncertainty between the arrival time of probe packets at the target router and the time at which the polling is affected, is less than the polling interval. In this way, we may construct a stream of probe packet sets, one per polling interval. While polling intervals of 5 minutes are the norm, shorter intervals are certainly feasible. Indeed, it has been claimed that a polling interval as small as 1 second may be used without impacting router performance.

The techniques described above can be applied as follows:

Burst Loss Probing. This measurement application aims to determine how many packets in a closely spaced probe set are successfully transmitted and received. This information is useful for investigating the likely performance of TCP transmission along a path, without requiring the measurement endpoint to actually implement the TCP protocol. In the application of our methods, probe packet sets of the desired size and with appropriately closely spaced packets, are dispatched to the target device with e.g., the timeout based method used to delineate the boundary between groups.

Trajectory Monitoring. In our method there need be no essential difference in role between the measurement target (i.e. the destination IP address of the probe packets), and any other ordinary router in the probe packets' path. Thus each ordinary router equipped with NetFlow or an appropriate SNMP MIB may generate reports on the probe packets. These reports, when collated at a collector, enable one to determine the performance experienced by the probe packets at successive hops along a path. For example, by comparing the number of packets that reach successive routers on the path, one can determine the loss experienced on the link connecting them. If the reports contain timestamps generated by synchronized clocks, one can, potentially, determine the latency on the hop, although packet loss may complicate this. For example, if the first packet of a burst is lost on a link, the timestamp of first packet arrival in the NetFlow records generated at the initial and terminal nodes of the links will not correspond to the same packet. One way to ameliorate this would be to set a TCP flag on the first packet of a probe set that is not used by any other packet in the set. Since NetFlow reports the cumulative OR of the TCP flags of the entire packet in a flow, the collector can determine whether or not the first packet reached the reporting router. Delay analysis could then ignore the results of all probe sets for which the flag was not set. On the other hand, this may bias delay estimation against those probes sets that tend to suffer loss. A similar way (tailored to NetFlow version 9) is for the sender to set the TTL of the first packet substantially different from those of other packets. Since the maximum and minimum TTL seen for the flow is reported, if the probe sender sets a substantially different TTL for the first packet, the collector can detect from the reports, whether or not the first packet had been observed.

Multicast Inference from Aggregates. (MIfA). Multicast Inference is a method to infer network internal performance from measurements performed at a network edge. Thus the setting is somewhat different from the previous example: instead of assuming that we can take direct measurement from ordinary routers along a probe packet path, we that the measurements are not available from the network portions whose performance we wish to determine. Possible reasons for this are (i) NetFlow is only enabled in routers at the Network edge, e.g., to reduce measurement load and license costs (ii) there is no access to NetFlow statistics or administrative access to router MIBs e.g. because the routers in question reside in another provider's network. MIfA of loss rates requires (i) setting up a multicast group that is routed through the network under study; (ii) sending probe packet sets from one or more group members; (iii) having each receiver report the number of packets received in each probe set to a collector; and (iv) collating the reports at a collector to infer performance on the logical links of the multicast tree. The analysis requires matching up the reports from different group members on each probe set. Our method is well suited to this requirement since it can distinguish reports in suitably spaced groups. In the setup for this measurement, we do not assume that the ordinary routers are themselves able to serve as multicast group members, although this is not precluded. Instead, some additional devices would serve as multicast group members, while ordinary routers (e.g. peering or other edge routers) sitting at the border of the network under study, each on the path between one of the participating devices and the network under study, would provide the measurements by observing traffic en route. This setup is attractive since, compared with using measurements taken at the group member devices, it enables us to factor out from our measurements the performance on the path portion between the devices and the boundary of the network under study.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of measuring a parameter of a packet network, comprising: transmitting a plurality of probe packets in the packet network to at least one instructionless element, each of the plurality of probe packets having a common key distinguishing each of the plurality of probe packets from other data in the packet network, and each of the plurality of probe packets having a common aggregation characteristic, the common aggregation characteristic corresponding to a measurement capability causing the at least one instructionless element to aggregate the plurality of probe packets in at least one aggregation report; wherein the at least one instructionless element does not receive any specific instructions regarding the at least one aggregation report; receiving the at least one aggregation report from the at least one instructionless element regarding the plurality of probe packets; isolating an aggregation report from the at least one aggregation report to determine the parameter of the packet network; and sending a reset packet as the last packet of the plurality of probe packets.

2. The method of claim 1, wherein the common key is a single dimensional key.

3. The method of claim 1, wherein the common key is a multi-dimensional key.

4. The method of claim 1, further comprising:
matching probe packets and the at least one aggregation reports using clocks at the source of probe packets and at the at least one instructionless element that are synchronized.

5. The method of claim 1, further comprising:
matching the plurality of probe packets and the at least one aggregation report by counting from the commencement of probing; and
identifying gaps in the at least one aggregation report due to complete loss of a probe.

6. The method of claim 1, further comprising:
setting the time between dispatch of the first and last probe packets of the plurality of probe packets to a value less than an inactive timeout period.

7. The method of claim 6, further comprising:
setting the time between dispatch of a first plurality of probe packets and dispatch of a second plurality of probe packets to a value greater than the inactive timeout period.

8. The method of claim 1, further comprising:
sending a transmission control protocol finish as the last packet of the plurality of probe packets.

9. The method of claim 8, further comprising:
sending multiple transmission control protocol finish packets as the last packets of the plurality of probe packets.

10. The method of claim 8, further comprising:
transmitting a subset of the plurality of probe packets that exclusively causes increments in cumulative counts of packets kept by a network element.

11. The method of claim 1 wherein the at least one instruction less element is an edge element.

12. The method of claim 1, further comprising: sending multiple reset packets as the last packets of the plurality of packets.

* * * * *